(12) United States Patent
Harita

(10) Patent No.: US 7,751,200 B2
(45) Date of Patent: Jul. 6, 2010

(54) DISPLAY APPARATUS

(75) Inventor: Keisuke Harita, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/426,797

(22) Filed: Apr. 20, 2009

(65) Prior Publication Data

US 2010/0053912 A1    Mar. 4, 2010

(30) Foreign Application Priority Data

Aug. 29, 2008    (JP)    ............................. 2008-221480

(51) Int. Cl.
*H05K 5/00*    (2006.01)
(52) U.S. Cl. .................... 361/752; 361/800; 174/138 E
(58) Field of Classification Search ................. 361/752, 361/790, 797, 800, 720, 760, 748, 736, 803, 361/801, 807; 312/223; 174/138
See application file for complete search history.

(56) References Cited

U.S. PATENT DOCUMENTS

| | | | |
|---|---|---|---|
| 6,198,222 B1 * | 3/2001 | Chang | 313/582 |
| 6,964,581 B2 * | 11/2005 | Chen et al. | 439/547 |
| 7,077,527 B2 | 7/2006 | Tajima et al. | |
| 7,463,490 B2 * | 12/2008 | Kim et al. | 361/752 |
| 7,515,403 B2 * | 4/2009 | Hong | 361/679.22 |
| 2007/0046852 A1 * | 3/2007 | Kim et al. | 349/58 |
| 2009/0121096 A1 | 5/2009 | Nonaka | |

FOREIGN PATENT DOCUMENTS

| | | |
|---|---|---|
| JP | 6-77683 | 3/1994 |
| JP | 6-252570 | 9/1994 |
| JP | 7-35421 | 2/1995 |
| JP | 2000-010493 | 1/2000 |
| JP | 2001-337611 | 12/2001 |
| JP | 2003-150076 | 5/2003 |
| JP | 2006-65139 | 3/2006 |
| JP | 2007-199705 | 8/2007 |
| JP | 2008-033093 | 2/2008 |
| JP | 2009-086276 | 4/2009 |
| JP | 2009-122347 | 6/2009 |

* cited by examiner

*Primary Examiner*—Hung S Bui
(74) *Attorney, Agent, or Firm*—Blakely, Sokoloff, Taylor & Zafman LLP

(57) ABSTRACT

According to one embodiment, a display apparatus includes a housing, a display panel contained in the housing, a longitudinal frame extending vertically along a back surface of the display panel and secured to the display panel, a circuit board electrically connected to the display panel, and a chassis member on which the circuit board is mounted. The chassis member is a plate-like member of a size greater than or equal to that of the circuit board, arranged between the longitudinal frame and an horizontal edge part of the display panel, supported by the longitudinal frame to be opposed to the back surface of the display panel, and provided with a stud pin to which the circuit board is secured.

11 Claims, 9 Drawing Sheets

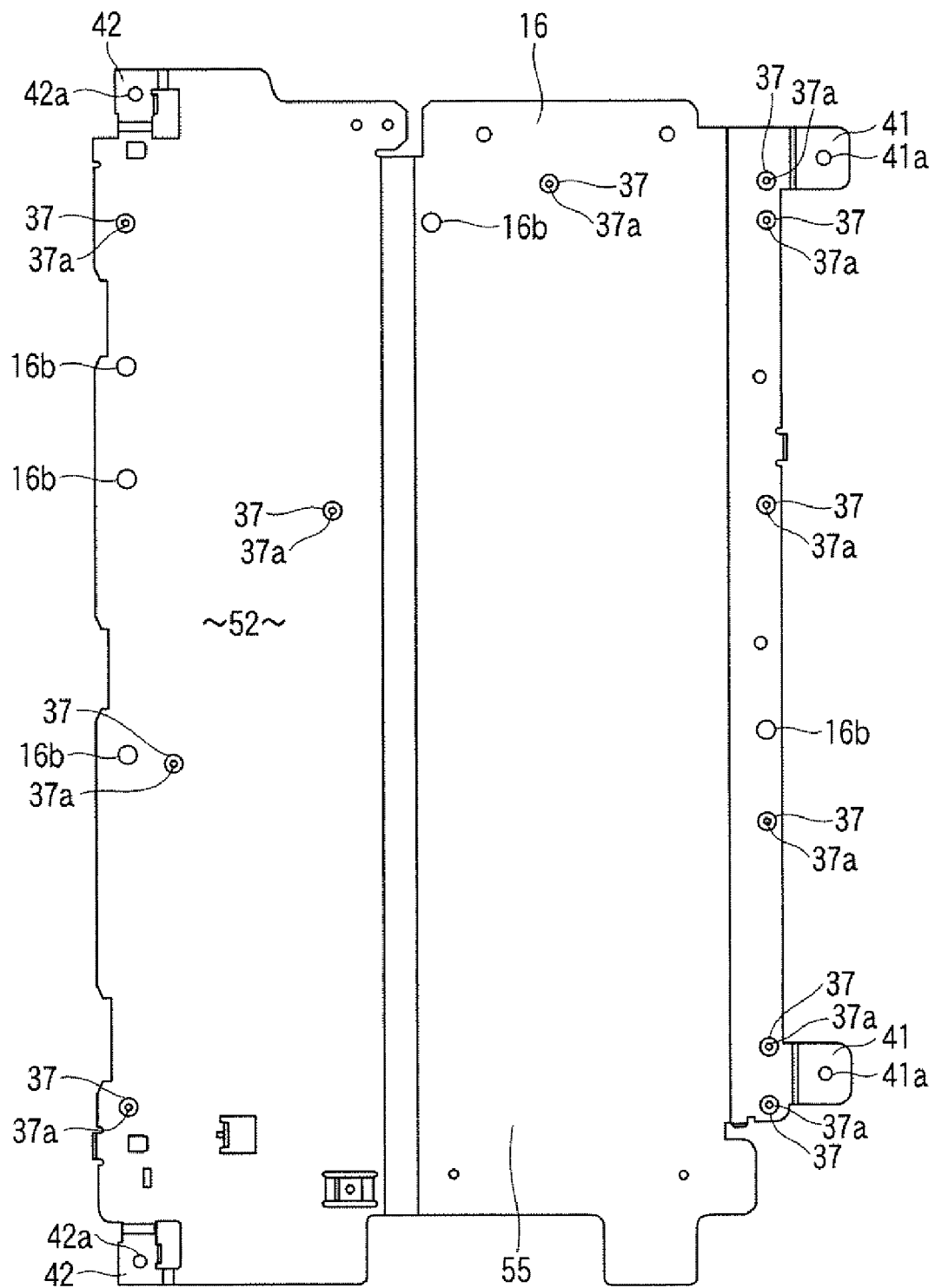
F I G. 5

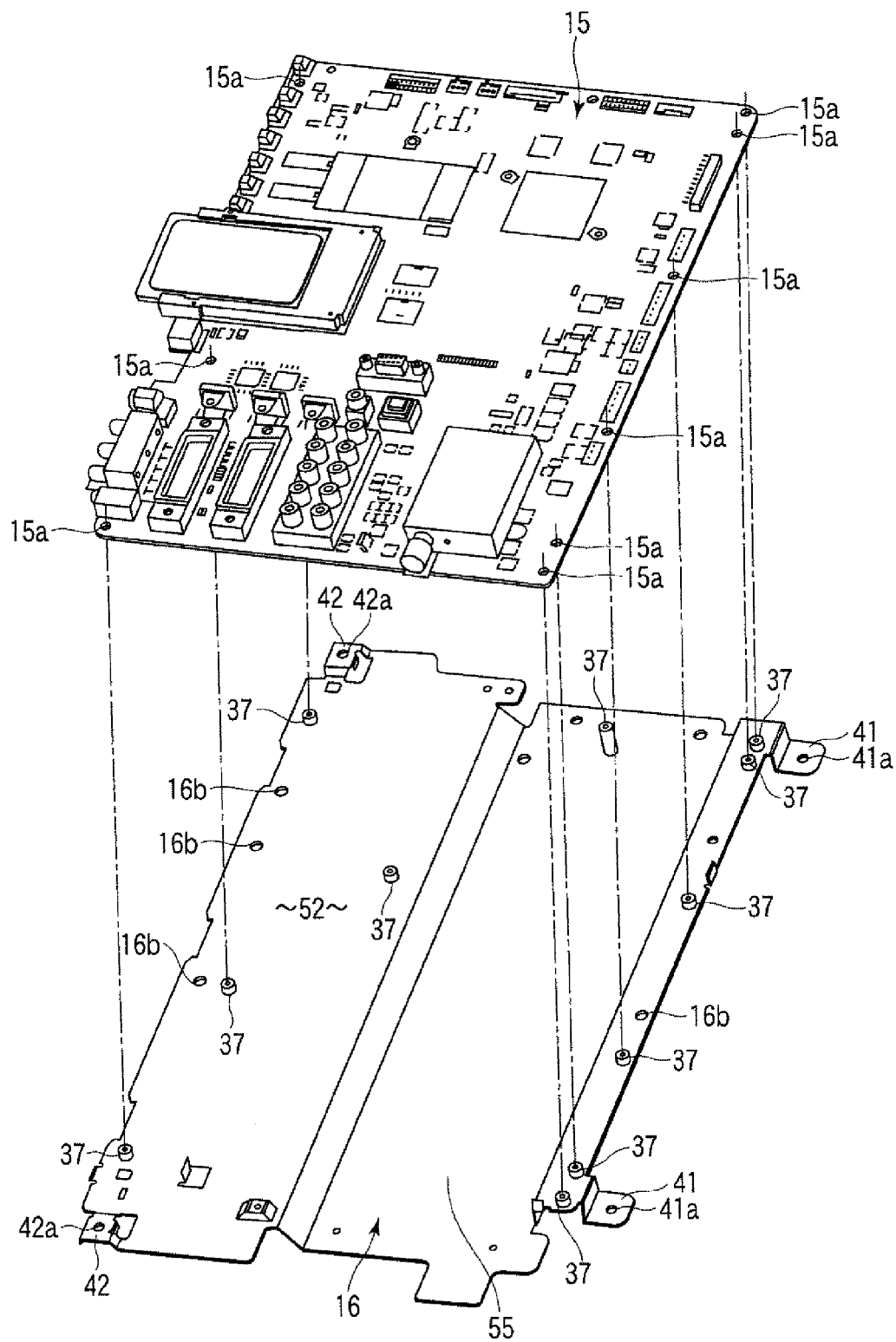
F I G. 7

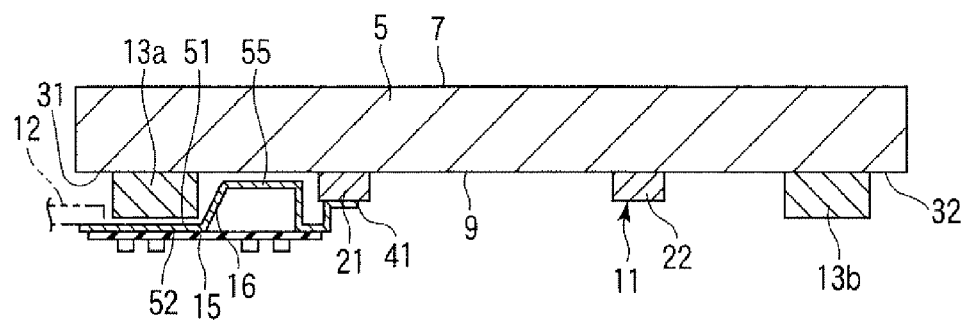
F I G. 9
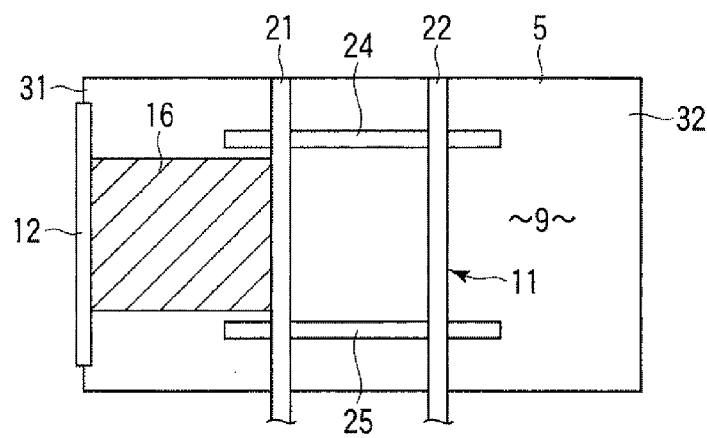
F I G. 10
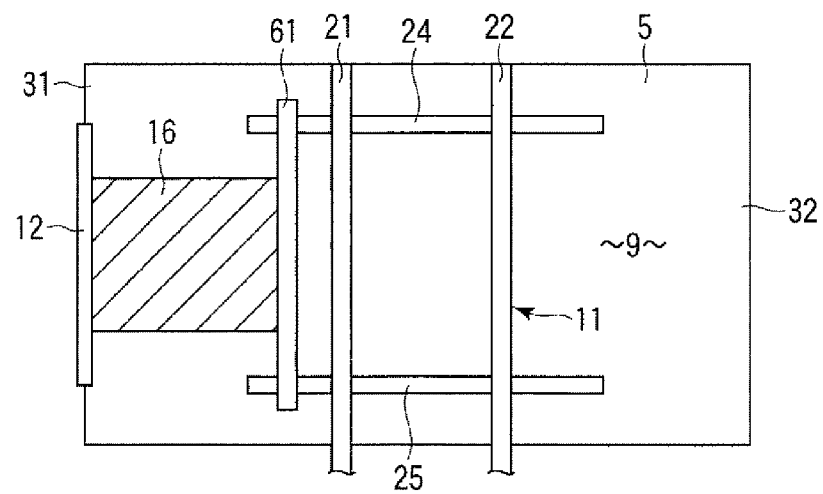
F I G. 11

DISPLAY APPARATUS

CROSS-REFERENCE TO RELATED APPLICATIONS

This application is based upon and claims the benefit of priority from Japanese Patent Application No. 2008-221480, filed Aug. 29, 2008, the entire contents of which are incorporated herein by reference.

BACKGROUND

1. Field

One embodiment of the invention relates to a display apparatus comprising a circuit board.

2. Description of the Related Art

A display apparatus such as a liquid crystal television comprises a chassis member for reinforcing a display panel, and also comprises a circuit board for processing the image.

In Jpn. Pat. Appln. KOKAI Publication No. 2007-199705, a plasma display apparatus comprising a chassis member is disclosed. This chassis member comprises three base metallic plates to be attached to the display panel, a combining metallic plate for combining these three base metallic plates with each other, and a plurality of formed angles for reinforcing the combining metallic plate.

Incidentally, further improvement in workability of assembling is demanded of such a display apparatus as that described above. In the chassis member described in the above patent document, much labor is required for the work for combining the plurality of members with each other, and the workability of assembling is not very good.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 5 is an exemplary plan view of the chassis member according to the embodiment of the invention;

FIG. 7 is an exemplary exploded perspective view showing the AV board and chassis member shown in FIG. 4;

FIG. 9 is an exemplary cross-sectional view showing the display panel and chassis member shown in FIG. 2 taken along line F9-F9;

FIG. 10 is an exemplary rear view of a frame structure body according to the embodiment of the invention; and FIG. 11 is an exemplary rear view of a frame structure body according to the embodiment of the invention.

DETAILED DESCRIPTION

Various embodiments according to the invention will be described hereinafter with reference to the accompanying drawings. In general, according to one embodiment of the invention, a display apparatus comprises a housing, a display panel contained in the housing, a longitudinal frame extending vertically along a back surface of the display panel and secured to the display panel, a circuit board electrically connected to the display panel, and a chassis member on which the circuit board is mounted. The chassis member is a plate-like member of a size greater than or equal to that of the circuit board. The chassis member is arranged between the longitudinal frame and a horizontal edge part of the display panel, supported by the longitudinal frame to be opposed to the back surface of the display panel, and provided with a stud pin to which the circuit board is secured.

An embodiment of the present invention will be described below with reference to FIGS. 1 to 11.

Figure 1:
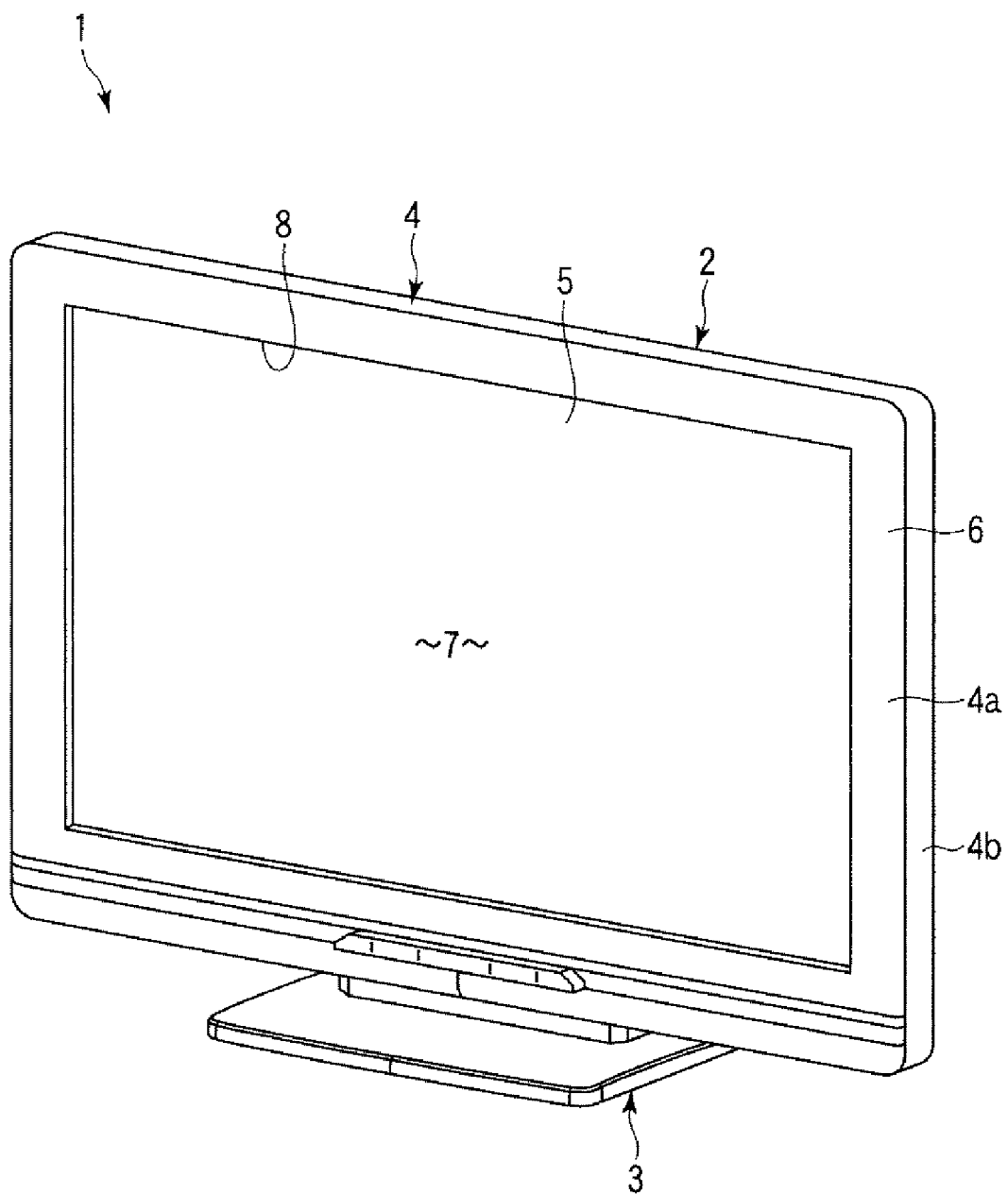
FIG. 1 is an exemplary perspective view of a display apparatus according to an embodiment of the invention.

FIG. 1 shows the entirety of a display apparatus 1 according to the embodiment. The display apparatus 1 is, for example, a liquid crystal television. It should be noted that various display apparatuses comprising a plasma television, and organic electroluminescence television (organic EL television) widely correspond to the display apparatus mentioned in the present invention.

As shown in FIG. 1, the display apparatus 1 comprises a display main unit 2, and stand 3. The stand 3 is placed on, for example, a television stand. The television stand is an example of a placement surface on which the display apparatus 1 is placed. The display main unit 2 is formed into a flat shape, and is supported on the stand in a rising posture. It should be noted that the display apparatus 1 mentioned in the present invention is not limited to those to be placed on the television stand, and may be, for example, those of the wall-mounted type to be hung on the wall by using metal fittings.

As shown in FIG. 1, the display main unit 2 comprises a housing 4, and a display panel 5 contained in the housing 4. The housing 4 is made of, for example, a synthetic resin, and is formed into a flat box-like shape. The display panel 5 is formed into a flat rectangular shape. The display panel 5 is, for example, a Liquid Crystal Display (LCD). It should be noted that various display panels comprising a plasma display, and organic electroluminescence display (organic EL display) widely correspond to the display panel mentioned in the present invention.

The housing 4 comprises a front cover 6, and back cover (not shown). The front cover 6 comprises a front wall 4a of the housing 4, and a part of a peripheral wall 4b thereof, and surrounds a peripheral part of the display panel 5. The back cover comprises a back wall of the housing 4, and a part of the peripheral wall 4b, and is formed into a box-like shape opening toward the front of the housing 4. The back cover is detachably combined with the front cover 6, and covers the display panel 5 from behind.

Figure 2:
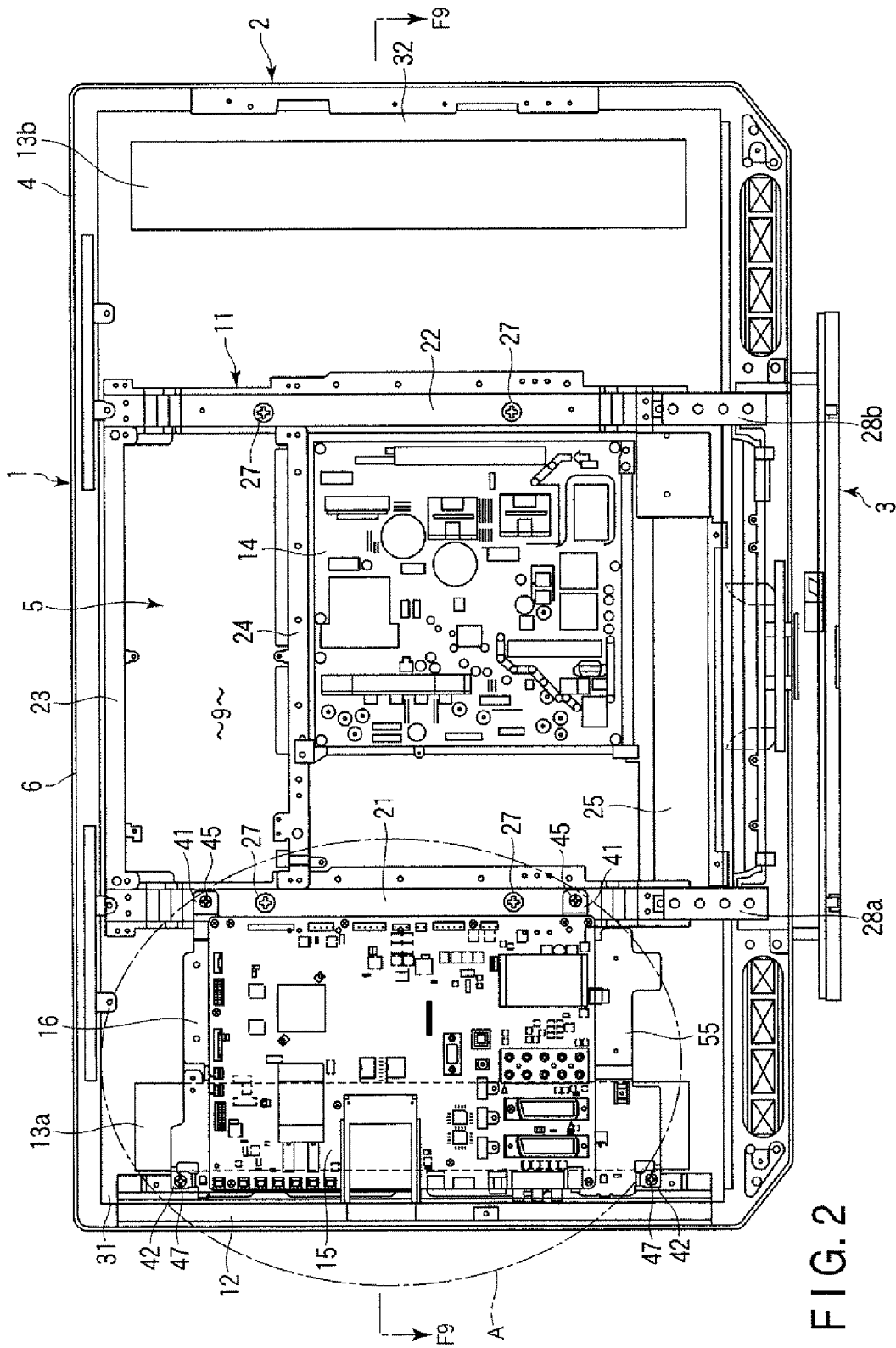
FIG. 2 is an exemplary rear view showing the inside of the display apparatus shown in FIG. 1.

As shown in FIG. 1, the display panel 5 comprises a display screen 7 for displaying an image. The front wall 4a of the housing 4 comprises an opening part 8 for exposing the display screen 7 of the display panel 5 to the outside of the housing 4. FIG. 2 is a view of the display apparatus 1 (that is, the television set) viewed from behind with the back cover removed. As shown in FIG. 2, the display panel 5 comprises a back surface 9 formed on the opposite side of the display screen 7. The back surface 9 is directed to the rear side of the display apparatus 1, and rises in the vertical direction.

As shown in FIG. 2, the display apparatus 1 comprises a frame structure 11, subframe 12, a pair of inverters 13a and 13b, power supply circuit board 14, AV board 15, and chassis member 16 called, for example, a tray chassis. Here, the part encircled by an alternate long and short dash line A in FIG. 2 is the AV board 15 and chassis member 16.

Figure 3:
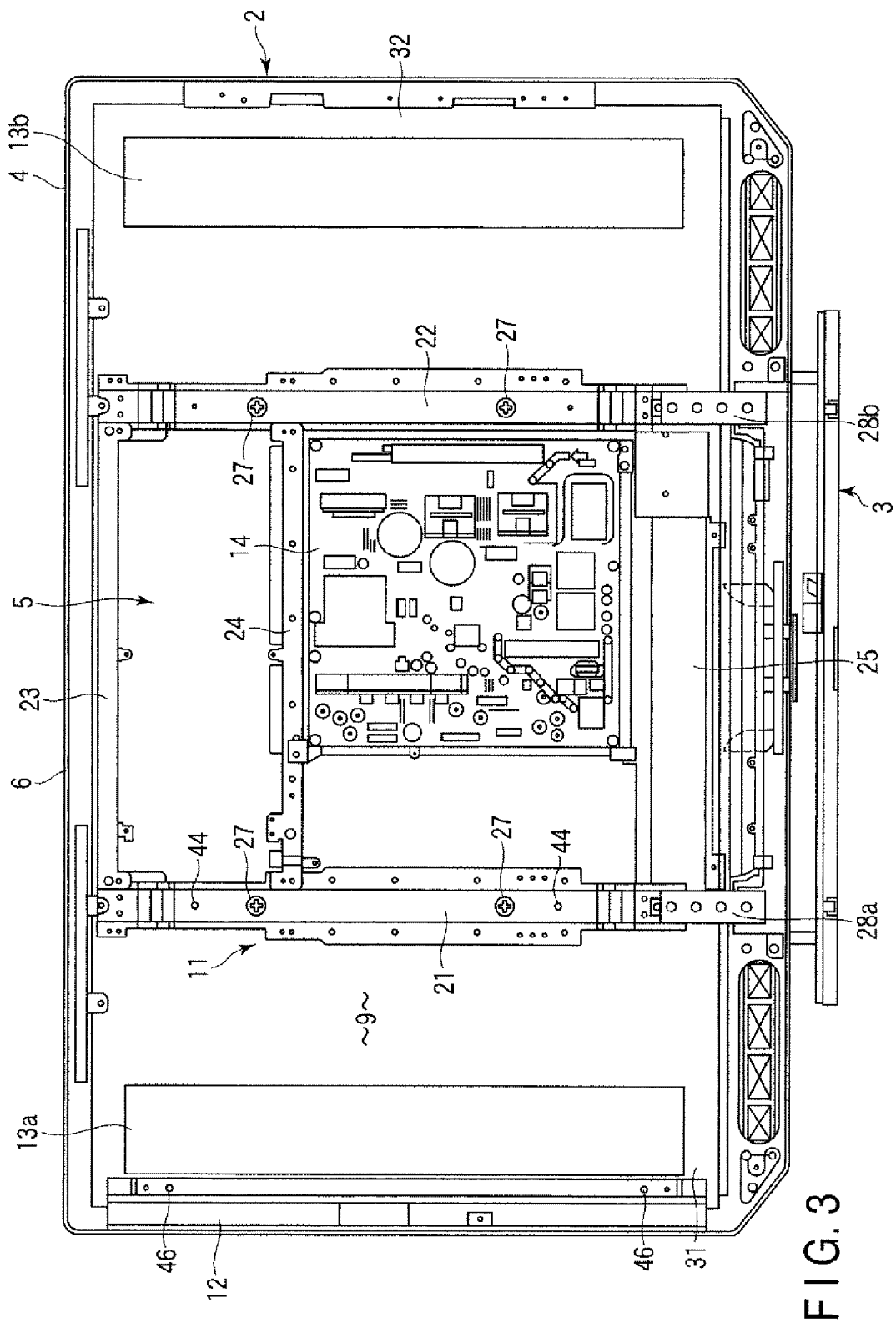
FIG. 3 is an exemplary rear view showing the inside of the display apparatus shown in FIG. 1.

FIG. 3 is a view of the display apparatus 1 viewed from behind in a state where the back cover, AV board 15, and chassis member 16 are detached from the apparatus 1. As shown in FIG. 3, the frame structure 11 is attached to the back surface 9 of the display panel 5. The frame structure 11 comprises, for example, two longitudinal frames 21 and 22, and, for example, three lateral frames 23, 24, and 25. These frames 21, 22, 23, 24, and 25 are each thin and long metallic plates. In each of the frames 21, 22, 23, 24, and 25, a rib is formed in the longitudinal direction by a folding process, and relatively high strength is thereby obtained.

As shown in FIG. 3, the two longitudinal frames 21 and 22 (hereinafter referred to as the first and second longitudinal frames 21 and 22) are separate from each other in the horizontal direction, and each extend in the vertical direction along the back surface 9 of the display panel 5. The first and second longitudinal frames 21 and 22 are provided at positions off horizontal edge parts 31 and 32 (to be described later in detail) of the display panel 5. That is, the first and second longitudinal frames 21 and 22 are not provided along the edge parts 31 and 32 of the display panel 5.

The first and second longitudinal frames 21 and 22 are each secured to the back surface 9 (for example, a back surface plate) of the display panel 5, and reinforce and support the display panel 5 The first and second longitudinal frames 21 and 22 are secured by screw fixed to the display panel 5 by means of, for example, screws 27.

A lower end part of each of the first and second longitudinal frames 21 and 22 is secured to a stand assembly 28a, 28b provided on the stand 3, and is supported on the stand 3. It should be noted that when the display apparatus 1 is of the wall-mounted type, supports for wall-hanging are attached to the first and second longitudinal frames 21 and 22.

Here, in this description, the right-and-left direction is defined on the basis of the state where the display apparatus 1 is viewed from behind (that is, on the basis of FIG. 3). According to this, of the two longitudinal frames 21 and 22, the first longitudinal frame 21 is a longitudinal frame arranged on the left. Further, of the two longitudinal frames 21 and 22, the second longitudinal frame 22 is a longitudinal frame arranged on the right.

As shown in FIG. 3, the three lateral frames 23, 24, and 25 (hereinafter referred to as the first to third lateral frames 23, 24, and 25) are separate from each other in the vertical direction, and each extend in the horizontal direction along the back surface 9 of the display apparatus 1. The first to third lateral frames 23, 24, and 25 are each hung between, for example, the first and second longitudinal frames 21 and 22. As a result of this, the frame structure 11 is assembled into a framework structure, thereby reinforcing the display panel 5. The first to third lateral frames 23, 24, and 25 are each arranged between, for example, the first and second longitudinal frames 21 and 22.

As shown in FIG. 3, the display panel 5 comprises two edge parts 31 and 32 (first and second edge parts 31 and 32) as edge parts in the horizontal direction. The first edge part 31 is, for example, a left edge part. The second edge part 32 is, for example, a right edge part. The first and second edge parts 31 and 32 each extend in the vertical direction.

As shown in FIG. 3, the subframe 12 is provided along the horizontal edge part of the display panel 5. The subframe 12 according to this embodiment is provided along the first edge part 31 (that is, the left edge part) of the display panel 5, and extends in the vertical direction. The subframe 12 is a metallic plate similar to, for example, the longitudinal frame 21. The subframe 12 is secured to, for example, the front cover 6.

As shown in FIG. 3, a pair of inverters 13a and 13b (hereinafter referred to as the first and second inverters 13a and 13b) are arranged separately from each other on the right and left of the frame structure 11. The first inverter 13a is mounted along, for example, the left end part of the back surface 9 of the display panel 5, and extends in the vertical direction. The second inverter 13b is mounted along, for example, the right end part of the back surface 9 of the display panel 5, and extends in the vertical direction.

As shown in FIG. 2, the power supply circuit board 14 is arranged in an area surrounded by the first and second longitudinal frames 21 and 22, and the second and third lateral frames 24 and 25, and is opposed to the central part of the display panel 5.

As shown in FIG. 2, the AV board 15 is of a size such that it can be arranged in an area between the first longitudinal frame 21 and the edge part 31 of the display panel 5, and is arranged between the first longitudinal frame 21 and the edge part 31 of the display panel 5. The AV board 15 is an example of the circuit board mentioned in the present invention. The AV board 15 is a circuit board for processing an image displayed on the display panel 5. It should be noted that the circuit board (that is, the circuit board attached to the chassis member) mentioned in the present invention is not limited to the AV board, and various circuit boards can be used. The AV board 15 is electrically connected to the display panel 5.

As shown in FIGS. 2, and 4 to 8, the chassis member 16 is an attachment member for attaching the AV board 15 to the inside of the housing 4. The chassis member 16 according to this embodiment is formed of a plate-like member. One chassis member 16 is prepared for one circuit board (in this case, the AV board 15). It should be noted that two or more chassis members 16 may be provided, when a plurality of circuit boards are provided, according to the number of the circuit boards.

The chassis member 16 is formed by subjecting a sheet of metallic plate to a folding process. That is, the chassis member 16 is formed of a material having a current-conducting characteristic, i.e., electrical conductivity. Further, the chassis member 16 is connected to the ground not shown.

Figure 4:
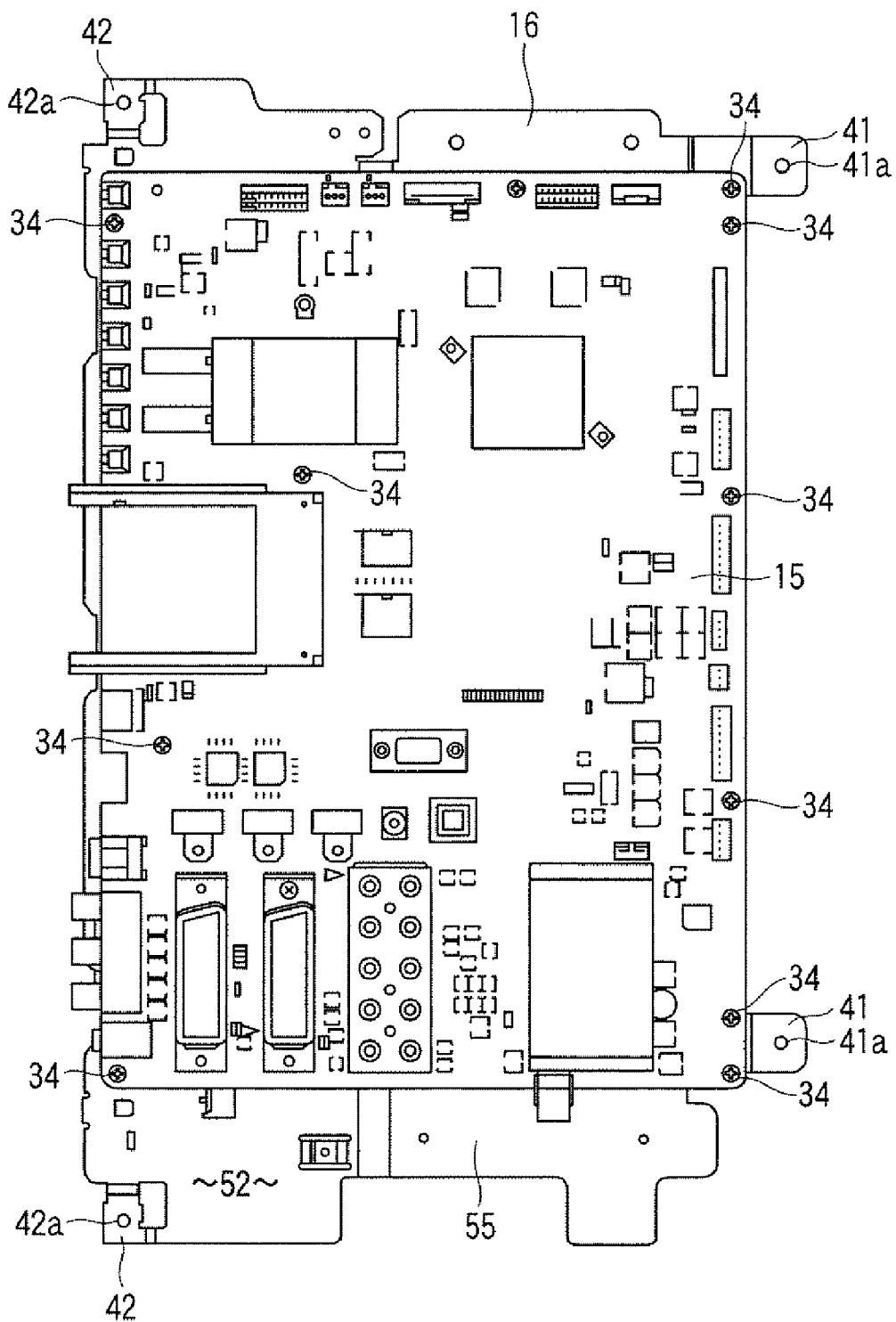
FIG. 4 is an exemplary plan view of an AV board and chassis member according to the embodiment of the invention.

As shown in FIG. 4, the chassis member 16 is formed larger than the AV board 15. That is, the chassis member 16 is larger than the external shape of the AV board 15, and is of a size such that it covers the entirety of one surface of the AV board 15. It should be noted that the chassis member 16 may be equal in size to, for example, the AV board 15.

Further, as shown in FIG. 2, the chassis member 16 is of a size such that it can be arranged in the area between the first longitudinal frame 21 and the horizontal edge part 31 of the display panel 5, and is arranged between the first longitudinal frame 21 and the edge part 31 of the display panel 5. That is, the chassis member 16 does not cross the first longitudinal frame 21 to extend to the second longitudinal frame 22 side.

In other words, the chassis member 16 is arranged between one of the first and second longitudinal frames 21 and 22, and one of the two edge parts 31 and 32 of the display panel 5 which is closer to the selected one of the longitudinal frames.

It should be noted that the expression "the chassis member is of a size such that it can be arranged between the longitudinal frame and the horizontal edge part of the display panel" mentioned in the present invention implies that the chassis member does not extend beyond the longitudinal frame to protrude from the longitudinal frame. The expression comprises the state where a part of the chassis member overlaps the longitudinal frame.

As shown in FIG. 7, the AV board 15 is provided with a plurality of screw insertion hole parts 15a into which screws 34 are inserted. The plurality of screw insertion hole parts 15a are provided at, for example, a peripheral part of the AV board 15.

Figure 6:
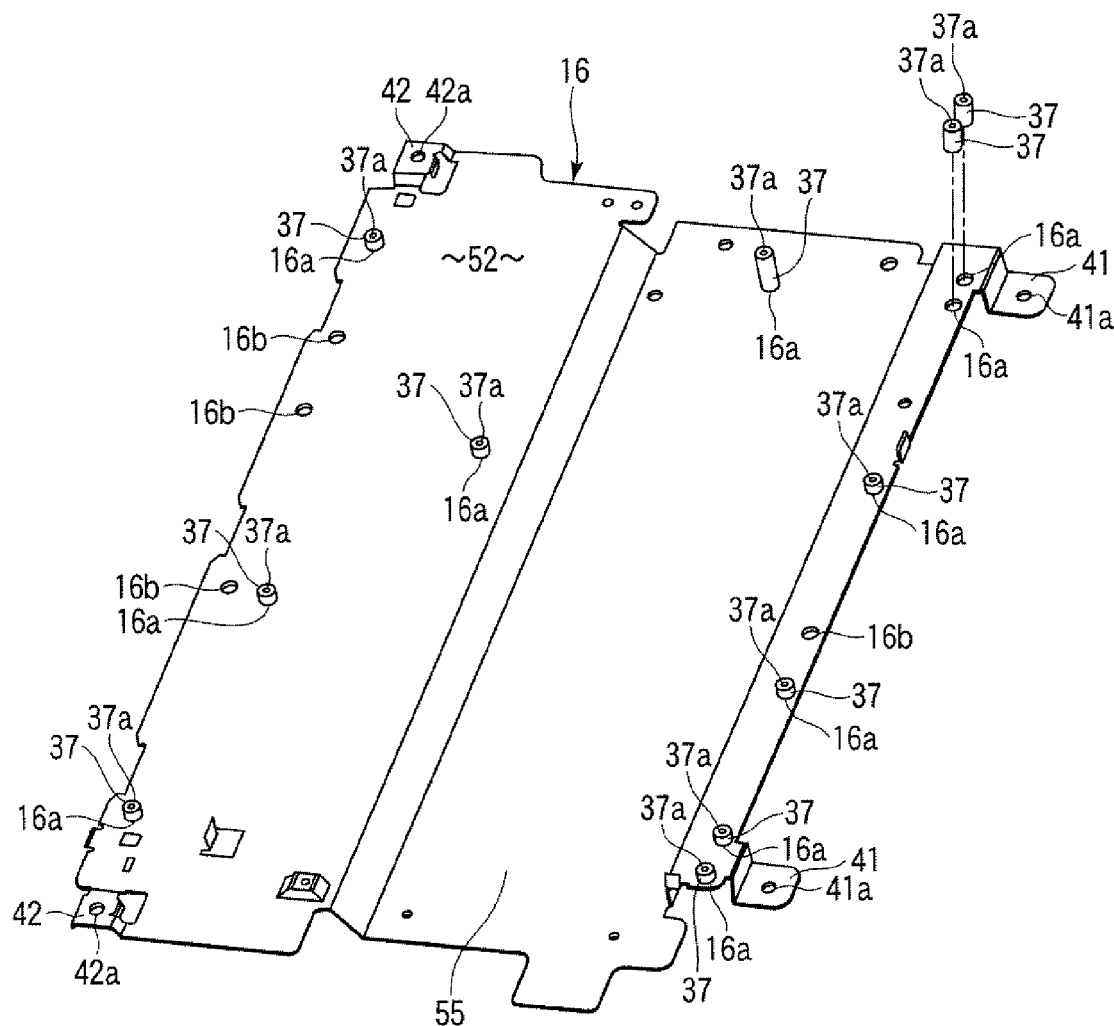
FIG. 6 is an exemplary perspective view of the chassis member shown in FIG. 5.
Figure 8:
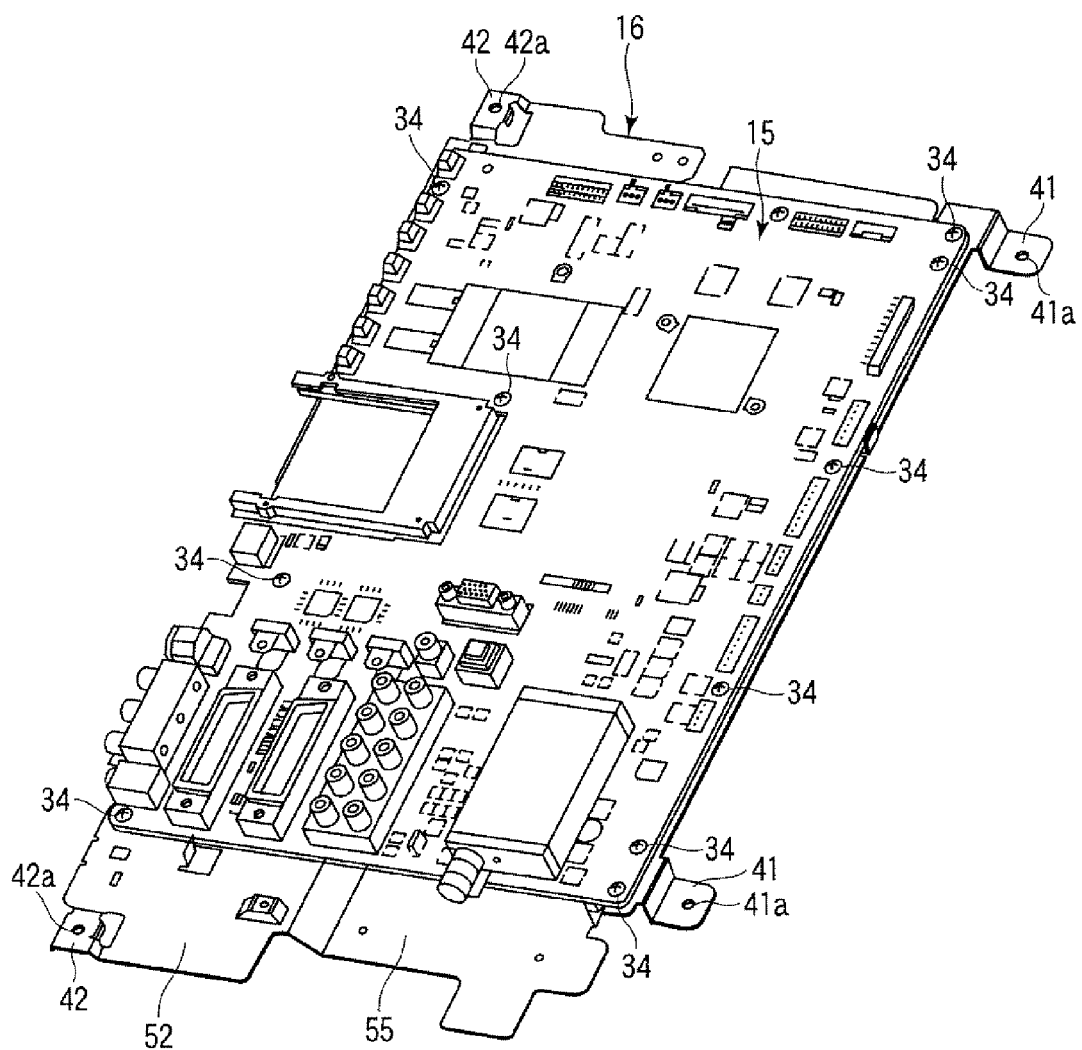
FIG. 8 is an exemplary perspective view of the AV board and chassis member shown in FIG. 4.

As shown in FIG. 6, the chassis member 16 is provided with a plurality of through-hole parts 16a opening at positions corresponding to the screw insertion hole parts 15a of the AV board 15, and stud pins 37 attached to the through-hole parts 16a. The stud pin 37 is inserted into the through-hole parts 16a, and is secured to the through-hole part by, for example, caulking. The stud pin 37 comprises a threaded hole part 37a in which an internal thread is formed. The screw 34 inserted into the screw insertion hole part 15a of the AV board 15 is engaged with the threaded hole part 37a of the stud pin 37, whereby the AV board 15 is secured to the stud pin 37. As a result of this, the AV board 15 is attached to the chassis member 16.

As shown in FIGS. 5 and 6, the chassis member 16 comprises through-hole parts 16b other than the through-hole parts 16a to which stud pins 37 are attached. Hereinafter, the through-hole part to which a stud pin 37 is attached is referred to as the first through-hole part 16a, and the through-hole part to which no stud pin 37 is attached is referred to as the second through-hole part 16b. For example, a plurality of the second through-hole parts 16b are provided, and a stud pin 37 can be attached to each of them like the first through-hole part 16a.

Here, when the destination of the product is different, a different board is employed. That is, the AV board 15 differs in size and arrangement of components from destination to destination, whereby positions of the screw insertion hole parts 15a differ from destination to destination.

The second through-hole parts 16b of the chassis member 16 are provided at positions corresponding to screw insertion hole parts of an AV board (that is, a circuit board) different from the AV board 15 described above. That is, the chassis member 16 is provided with through-hole parts at positions corresponding to all the screw insertion hole parts of a plurality of circuit boards differ from each other in the destination, and stud pins 37 are attached to the through-hole parts 16a among all the through-hole parts corresponding to screw insertion hole parts 15a of a specific AV board 15.

In other words, in the chassis member 16, through-hole parts to which stud pins 37 are attached are changed for each destination, whereby standardization is achieved so that one type of chassis member 16 can universally correspond to a plurality of destinations. Further, through-hole parts corresponding to a specific destination are the first through-hole parts 16a described above, and through-hole parts corresponding to the other destinations are the second through-hole parts 16b. As a result of this, it is possible to secure the other circuit board different from the AV board 15 described above to the chassis member 16 in place of the above-mentioned AV board 15.

As shown in FIGS. 2, 5, and 6, the chassis member 16 comprises first and second securing parts 41 and 42. For example, a plurality of first securing parts 41 are provided separate from each other at an upper right end part and a lower right end part of the chassis member 16. The first securing parts 41 are opposed to the first longitudinal frame 21, and are provided with screw insertion hole parts 41a. The first longitudinal frame 21 is provided with threaded hole parts 44 which are opposed to the screw insertion hole parts 41a of the first securing parts 41, and in which internal threads are formed. The screws 45 inserted into the screw insertion hole parts 41a are engaged with the threaded hole parts 44 of the longitudinal frame 21, whereby the chassis member 16 is secured to the first longitudinal frame 21, and is supported by the first longitudinal frame 21.

It should be noted that the expression "supported by the longitudinal frame" mentioned in the present invention implies, in addition to the case where the chassis member 16 is directly connected to the longitudinal frame 21 to be supported as in this embodiment, the case where the chassis member 16 is indirectly supported by the longitudinal frame 21 through, for example, a subframe or the like connected to the longitudinal frame or the lateral frame.

On the other hand, for example, a plurality of second securing parts 42 are provided separate from each other at an upper left end part and a lower left end part of the chassis member 16. The second securing parts 42 are opposed to the subframe 12, and are provided with screw insertion hole parts 42a. The subframe 12 is provided with threaded hole parts 46 which are opposed to the screw insertion hole parts 42a of the second securing parts 42, and in which internal threads are formed. The screws 47 inserted into the screw insertion hole parts 42a are engaged with the threaded hole parts 46 of the subframe 12, whereby the chassis member 16 is secured to the subframe 12, and is supported by the subframe 12.

That is, the chassis member 16 is arranged between the first longitudinal frame 21 and the subframe 12, and is supported by both the frame 21 and the subframe 12. By detaching the screws 45 and 47, the chassis member 16 can be detached from the first longitudinal frame 21 and the subframe 12 in a state where the AV board 15 attached to the chassis member 16 is mounted on the chassis member 16.

As shown in FIG. 2, the chassis member 16 and the AV board 15 overlap the inverter 13a in the thickness direction of the display panel 5. That is, the inverter 13a is opposed to the chassis member 16 and the AV board 15 in the thickness direction of the display panel 5.

FIG. 9 schematically shows the relationship between the display panel 5, inverter 13a, chassis member 16, and AV board 15 in the thickness direction of the display panel 5. The chassis member 16 comprises a first surface 51 facing the inverter 13a, and a second surface 52 directed to the opposite side of the first surface 51. The chassis member 16 supports the AV board 15 on the second surface 52. That is, the chassis member 16 is positioned between the AV board 15 and the inverter 13a, and covers the entire surface of the AV board 15 in such a manner that the AV board 15 does not directly face the inverter 13a.

As shown in FIG. 9, the chassis member 16 is provided with a depression part 55 depressed toward the display panel 5 at a part positioned between the first longitudinal frame 21 and the inverter 13a. That is, the chassis member 16 has a shape formed along the inverter 13a and the back surface 9 of the display panel 5.

Next, assembly of the part around the AV board 15 will be described below.

The chassis member 16 is prepared in a state where the stud pins 37 are attached to the member 16. In the assembly work, first, the AV board 15 is placed, from above, on top of the chassis member 16 laid on a flat surface (for example, a workbench). Then, the positions of the screw insertion hole parts 15a of the AV board 15 are made to coincide with those of the stud pins 37 of the chassis member 16, and the AV board 15 is screwed onto the chassis member 16. This screwing operation involves screwing the screws 34 downward into the chassis member 16 from above.

After the AV board 15 is secured to the chassis member 16, work for incorporating the AV board 15 and the chassis member 16 into the display apparatus main unit is carried out. That is, the chassis member 16 is placed, from above, on top of the display panel 5 of the display apparatus main unit laid on a flat surface (for example, a workbench). Then, the positions of the screw insertion hole parts 41a and 42a of the chassis member 16 are made to coincide with those of the threaded hole parts 44 of the longitudinal frame 21, and the threaded hole parts 46 of the subframe 12, and the chassis member 16 is screwed onto the longitudinal frame 21 and the subframe 12. This screwing operation involves screwing the screws 45 and 47 downward into the frame 21 and the subframe 12 from above. That is, in this embodiment, all the work associated with the assembly of the part around the AV board 15 is performed by the work substantially in one direction.

Next, the function of the display apparatus 1 will be described below.

The chassis member 16 has a current-conducting characteristic, is of a size such that it covers the entirety of the AV board 15, and is positioned between the inverter 13a and the AV board 15. As a result of this, the chassis member 16 functions as a shield, and makes the inverter 13a and the AV board 15 difficult to electromagnetically influence each other.

According to the display apparatus 1 configured as described above, it is possible to improve the ease of assembly (that is, manufacturability). That is, it is conceivable that for example, a structure formed by assembling a plurality of frames into a framework-shape may be used as the attachment member for mounting the AV board 15 in the housing. However, in the case where an attachment member formed by assembling a plurality of frames into a framework-shape is used, first, the work for assembling a plurality of frames becomes necessary, and the amount of man-hours and the number of screws become relatively large. Further, in the attachment member formed by assembling a plurality of frames, the tolerance of the part is constituted of the sum of the dimensional tolerances, and hence the tolerance of the part inevitably becomes large. Thus, the position of the through-hole part to which the stud pin is to be attached is liable to be misaligned. Accordingly, calibration work of the part tolerance becomes necessary, and it becomes difficult to improve the ease of assembly.

On the other hand, when the chassis member 16 is formed of a plate-like member like in this embodiment, first, the assembling work for the chassis member 16 itself is unnecessary, and hence the necessary man-hours are reduced, and the ease of assembly is improved. Further, in the chassis member 16 formed of a plate-like member, there is little room for entry of the part tolerance into the chassis member 16, and hence it is easy to achieve the positional accuracy of the through-hole parts 16a and 16b. As a result of this, the calibration work for the positions of the through-hole parts 16a and 16b easily becomes unnecessary, whereby the ease of assembly of the display apparatus 1 is further improved.

Further, even when the plate-like chassis member 16 is used as in the case of this embodiment, it is made relatively small such that it can be arranged between the longitudinal frame 21 and the horizontal edge part 31 of the display panel 5, whereby the chassis member 16 can be made relatively light. As a result of this, a display apparatus 1 capable of realizing both an improvement in the ease of assembly, and weight reduction is provided. Further, the chassis member 16 being relatively small as described above is used, whereby effective utilization of the space in the housing 4 can be achieved.

In the case where the display apparatus 1 comprises two longitudinal frames, and the chassis member 16 is arranged between one longitudinal frame 21 of the two longitudinal frames 21, 22, and one horizontal edge part 31 of the two horizontal edge parts 31, 32 of the display panel 5 which is closer to the longitudinal frame 21, the chassis member 16 becomes relatively small, which can contribute to weight reduction of the display apparatus 1. Further, the chassis member 16 does not overlap the longitudinal frames 21 and 22 in the thickness direction of the display panel 5, and hence it becomes easy to realize slimming down of the display apparatus 1.

Further, the chassis member 16 according to this embodiment is excellent in expandability. That is, when the chassis member 16 comprises through-hole parts 16a opening at positions corresponding to the screw insertion hole parts 15a of the AV board 15, and stud pins 37 attached to the through-hole parts 16a, and further comprises other through-hole parts 16b to which stud pins 37 can be attached, at positions corresponding to screw insertion hole parts of circuit boards other than the AV board 15, it is possible to utilize one type of chassis member 16 universally for any of a plurality of AV boards 15 which are different from each other in the positions of screw insertion hole parts.

More specifically, different types of AV boards 15 are employed depending on the destinations. An AV board 15 of a display apparatus 1 assembled for export to Japan is provided with, for example, a BS Conditional Access System (B-CAS) card slot mounted thereon. On the other hand, on an AV board 15 of a display apparatus 1 assembled for export to Europe, no B-CAS card slot is mounted. As described above, a different AV board 15 is employed depending on the destination of the display apparatus 1. In the plurality of AV boards 15 different from each other, for example, the external shape or the component arrangement is different, and hence the positions of the screw insertion hole parts are different.

The chassis member 16 according to this embodiment is provided with a plurality of through-hole parts corresponding to a plurality of destinations (that is, corresponding to positions of screw insertion hole parts of a plurality of types of AV boards), and through-hole parts to which stud pins 37 are to be attached are designated for each destination (that is, through-hole parts to which stud pins 37 are to be attached are changed correspondingly to each destination), whereby it becomes possible to attach an arbitrary AV board 15 to one type of chassis member 16. That is, by arbitrarily setting the positions of the stud pins 37, it becomes possible to cope with various types of boards, and it becomes further possible to carry out global expansion without largely changing the chassis structure of the display apparatus 1. As a result of this, it is possible to reduce the number of dies necessary for manufacturing the chassis structure, and realize cost reduction.

Further, according to the chassis member 16 associated with this embodiment, the chassis member 16 is also excellent in the expandability with respect the inch-expansion (that is, expansion into a plurality of types different from each other in screen size). More specifically, FIG. 10 shows the relationship between the frame structure 11 and the chassis member 16 in a display apparatus 1 of a predetermined size (for example, 40 in.). On the other hand, FIG. 11 shows the relationship between the frame structure 11 and the chassis member 16 in a display apparatus 1 larger than the predetermined size (for example, 46 in.). It should be noted that in each of FIGS. 10 and 11, a model comprising two lateral frames is shown for explanation.

As shown in each of FIGS. 10 and 11, in the display apparatus 1, the distance between the two longitudinal frames 21 and 22 is set to the same value for the purpose of standardization of the chassis structure. Here, as shown in FIG. 11, by adding one longitudinal frame 61 to the chassis structure, it is possible to carry out inch-expansion by means of one type of chassis member 16. As a result of this, it is possible to reduce the number of dies necessary for manufacturing the chassis structure, and realize cost reduction.

In the case where the chassis member 16 can be detached from the longitudinal frame 21 in the state where the AV board 15 is mounted on the chassis member 16, the chassis member 16 and the AV board 15 can be easily detached from the main unit 2 of the display apparatus 1. As a result of this, it is possible to perform the maintenance work of the AV board 15 in the state where the AV board 15 is mounted on the chassis member 16. As a result of this, the maintainability and the replaceability of the AV board 15 are improved.

In the case where the chassis member 16 is formed of a material having conductivity, and is positioned between the AV board 15 and the inverter 13a, the chassis member 16 functions as a shield, and makes the inverter 13a and the AV board 15 difficult to electromagnetically interfere with each other. That is, a shielding effect can be expected by the chassis member 16.

In the case where the chassis member 16 is provided with a depression part 55, and has a shape formed along the inverter 13a and the back surface 9 of the display panel 5, the electrical characteristic of the display panel 5 on the back surface 9 side easily becomes stable.

Although the display apparatus 1 according to the embodiment of the present invention has been described above, the present invention is not limited to this. In the present invention, the constituent elements can be modified and embodied in the implementation stage within the scope not deviating from the gist of the invention.

For example, the number of the circuit boards that can be attached to the chassis member 16 is not limited to one, and may be plural. Further, although one chassis member 16 is prepared for one circuit board (for example, an AV board 15), in the case where there are a plurality of circuit boards, a plurality of chassis members may be provided. The number and the shapes of longitudinal frames and lateral frames constituting the frame structure 11 are not limited to the shapes and the number of frames in the above embodiment, and arbitrary shapes and number may be employed in the implementation. The subframe 12 is not an indispensable constituent element. The chassis member 16 may be directly secured to the display panel 5. The depression part 55 may be omitted.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display apparatus comprising:
a housing;
a display panel in the housing;
a first frame extending along a back surface of the display panel;
a first circuit board comprising a fixture insertion hole; and
a chassis member arranged between the first frame and a first edge part of the display panel, and provided with a first hole and a second hole, the first hole corresponding to the fixture insertion hole of the first circuit board and having a stud pin to which the first circuit board is attached, the second hole being provided at a position different from the fixture insertion hole of the first circuit board and configured to have a stud pin for a second circuit board.

2. The display apparatus of claim 1, wherein a position of a fixture insertion hole of the second circuit board is different from that of the fixture insertion hole of the first circuit board.

3. The display apparatus of claim 1, wherein the chassis member is configured to allow the first circuit board to be replaced with the second circuit board without requiring a new hole.

4. The display apparatus of claim 1, wherein:
the first circuit board comprises a plurality of fixture insertion holes; and
the chassis member is provided with a plurality of first holes and a plurality of second holes, the number of the plurality of first holes is the same as the number of the plurality of fixture insertion holes.

5. The display apparatus of claim 4, wherein at least one of the plurality of second holes is provided between the plurality of first holes.

6. The display apparatus of claim 1, further comprising an inverter between the chassis member and the back surface of the display panel, the chassis member comprising a first surface which faces the inverter and a second surface which is opposite to the first surface and faces the first circuit board, the chassis member being conductive.

7. The display apparatus of claim 6, wherein the chassis member is a shield configured to block a part of an electromagnetic wave from the inverter toward the first circuit board.

8. The display apparatus of claim 6, wherein the chassis member has a shape formed along the inverter and the back surface of the display panel.

9. The display apparatus of claim 6, wherein the chassis member comprises a depression part between the inverter and the first frame.

10. The display apparatus of claim 1, further comprising a second frame, wherein:
the display panel comprises a second edge part;
the first and second frames are separate from each other in a direction connecting the first edge part and the second edge part; and
the first frame is closer to the first edge part than the second frame is.

11. The display apparatus of claim 1, wherein the chassis member is configured to be detached from the first frame in a state where the first circuit board mounted on the chassis member.

* * * * *